United States Patent [19]

Szoke

[11] Patent Number: 4,787,034

[45] Date of Patent: Nov. 22, 1988

[54] PROGRAM ACCESS SYSTEM

[76] Inventor: Pal Szoke, 20819 Anza Ave., Torrance, Calif. 90503

[21] Appl. No.: 91,361

[22] Filed: Aug. 28, 1987

Related U.S. Application Data

[63] Continuation of Ser. No. 671,461, Nov. 14, 1984, abandoned.

[51] Int. Cl.[4] .............................................. G06F 9/30
[52] U.S. Cl. ..................................... 364/300; 364/200
[58] Field of Search ... 364/200 MS File, 900 MS File, 364/300

[56] References Cited

U.S. PATENT DOCUMENTS

| | | | |
|---|---|---|---|
| 4,330,822 | 5/1982 | Dodson | 364/200 |
| 4,445,190 | 4/1984 | Pierschalla et al. | 364/900 |
| 4,454,579 | 6/1984 | Pilat et al. | 364/200 |
| 4,466,057 | 8/1984 | Houseman et al. | 364/200 |

OTHER PUBLICATIONS

Lorin, H. et al., "Operating Systems", Addison-Wesley Publishing Company, Reading, Mass., 1981, pp. 187-193 and 257-260.

*Primary Examiner*—Gareth D. Shaw
*Assistant Examiner*—Jonathan C. Fairbanks
*Attorney, Agent, or Firm*—Christensen, O'Connor, Johnson & Kindness

[57] ABSTRACT

A program access system that enables calling programs included in a first load module to CALL a callable program included within a second load module. The method of the present invention includes the steps of loading and commencing execution of the first load module, and upon the occurrence of a CALL from a calling program to the callable program, executing different steps depending on whether or not the callable program has already been loaded. When the callable program has not yet been loaded, the method includes the steps of determining the name of the second load module in which the callable program is included, loading the second load module, determining the actual address of the callable program, storing the actual address, and transferring control to the callable program at the actual address. Upon the occurrence of a CALL from a calling program to the callable program after the callable program has been loaded, the method includes the steps of transferring control to the callable program at the stored actual address.

5 Claims, 5 Drawing Sheets

E-TABLE

| SOURCE CODE | | TABLE ENTRY REFERENCE |
|---|---|---|
| ENTRY | P21 | E-1 |
| B | 40(R15) | E-2 |
| BR | R15 | E-3 |
| NOPR | R00 | E-4 |
| DC | CL8' LM-2' | E-5 |
| DC | F'0' | E-6 |
| ORG | P21+20 | E-7 |

*Fig. 3.*

S-TABLE

| SOURCE CODE | | TABLE ENTRY REFERENCE |
|---|---|---|
| DC | CL8' P21' | S-1 |
| DC | V(P21) | S-2 |

*Fig. 4.*

T-TABLE

| SOURCE CODE | | TABLE ENTRY REFERENCE |
|---|---|---|
| COMMENT | | T-1 |
| L | R15,16(R15) | T-2 |
| BR | R15 | T-3 |
| NOPR | R00 | T-4 |
| DC | CL8' P21' | T-5 |
| DC | V(P21) | T-6 |
| ORG | P21+20 | T-7 |

*Fig. 5.*

S-TABLE

| SOURCE CODE | | TABLE ENTRY REFERENCE |
|---|---|---|
| DC | CL8'P12' | S-1 |
| DC | V(P12) | S-2 |

*Fig. 7.*

T-TABLE

| SOURCE CODE | | TABLE ENTRY REFERENCE |
|---|---|---|
| ENTRY | P12 | T-1 |
| L | R15,16(R15) | T-2 |
| BR | R15 | T-3 |
| NOPR | R00 | T-4 |
| DC | CL8'P12' | T-5 |
| DC | V(P12) | T-6 |
| ORG | P12+20 | T-7 |

*Fig. 8.*

PROGRAM ACCESS SYSTEM

This application is a continuation application based on prior copending application Ser. No. 671,461, filed Nov. 14, 1984, now abandonded.

FIELD OF THE INVENTION

The present invention relates to methods and systems for operating digital computers, and, in particular, to methods and systems for providing access between programs running on a digital computer.

BACKGROUND OF THE INVENTION

A typical process for operating a digital computer involves the steps of writing a plurality of programs in one or more source languages, compiling (or assembling) the source programs into object modules, linking one or more object modules together into a load module, and loading and running the load module. In the typical case where the object modules and load modules are relocatable, the addresses in these modules are relative addresses, i.e., they are addresses relative to the beginning of the respective modules. The modules include relocation information which is used by the operating system to convert the relative addresses to absolute addresses when the modules are loaded for execution.

In a computer system including multiple programs, access between programs is generally accomplished by means of a CALL statement or its equivalent. The CALL statement includes the word CALL and also specifies the name of the program that is to be called. When such a statement is included in a source program, the compiler translates it into a statement for transferring control to the address where the callable program is located. Because the compiler has no way to determine the address of the callable program, the compiler lists the callable program as an unresolved external reference.

The process of combining a number of object modules into a load module is accomplished by a program commonly called a linkage editor. The linkage editor produces a relocatable load module in which addresses are relative to the beginning of the load module. In the case where one object module in a load module CALLs a second object module in that load module, the linkage editor resolves the reference such that the transfer representing the CALL statement transfers control to the relative address of the second object module in the load module. When the relocatable load module is to be executed, the operating system determines the beginning load location, converts all relative addresses to absolute addresses based upon that location, and then loads and runs the load module.

In systems such as those described above, the programmer who wishes to make a particular program available to several load modules must either include the program in each load module, or create a separate load module consisting of that program alone, and store such load module in a library. Both of these approaches have drawbacks. Storing the program in several load modules is redundant and wasteful of storage space. Storing the program as a separate load module leads to a complex library system in which the logical relationships between programs are obscured.

SUMMARY OF THE INVENTION

The present invention provides a program access system that enables programs in a first load module to CALL programs in other load modules. Using the system of the present invention, a program can therefore be included within a single load module, and yet be accessed from all other load modules in a software system.

In one aspect, the present invention provides a method for operating a digital computer such that calling programs included in a first load module can CALL a callable program included in a second load module. The method comprises loading and commencing execution of the first load module, and upon the occurrence of a CALL from a calling program to the callable program, executing different steps depending on whether or not the callable program has already been loaded. When the callable program has not yet been loaded, the method comprises determining the name of the second load module in which the callable program is included, loading the second load module, determining the actual address of the callable program, storing the actual address, and transferring control to the callable program at the actual address. Upon the occurrence of a CALL from a calling program to the callable program after the callable program has been loaded, the method comprises transferring control to the callable program at the stored actual address.

These and other features of the invention will become apparent in the detailed description and claims to follow, taken in conjunction with the accompanying drawings.

BRIEF DESCRIPTION OF THE DRAWINGS

FIG. 3 is a source listing of an E-table entry;

FIG. 4 is a source listing of an S-table entry;

FIG. 5 is a source listing of a T-table entry;

FIG. 7 is a source listing of a table entry for S-table 440 of FIG. 2;

FIG. 8 is a source listing of a table entry for T-table 460 of FIG. 2.

DETAILED DESCRIPTION OF THE INVENTION

Figure 1:
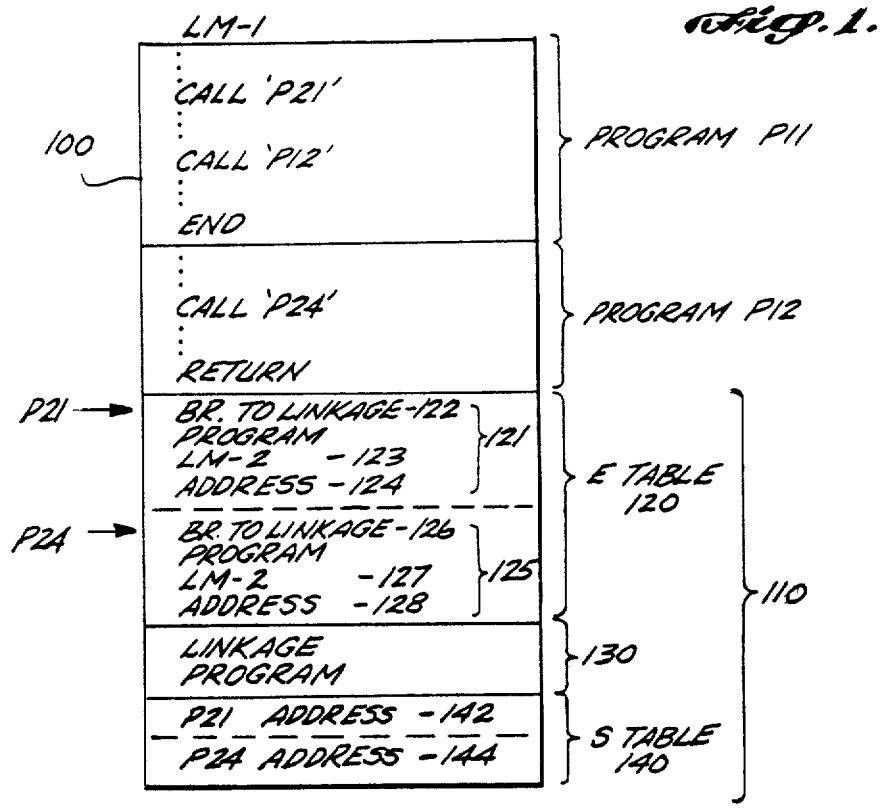
FIG. 1 is a schematic diagram of the two load modules that include the program access system of the present invention.
Figure 1:
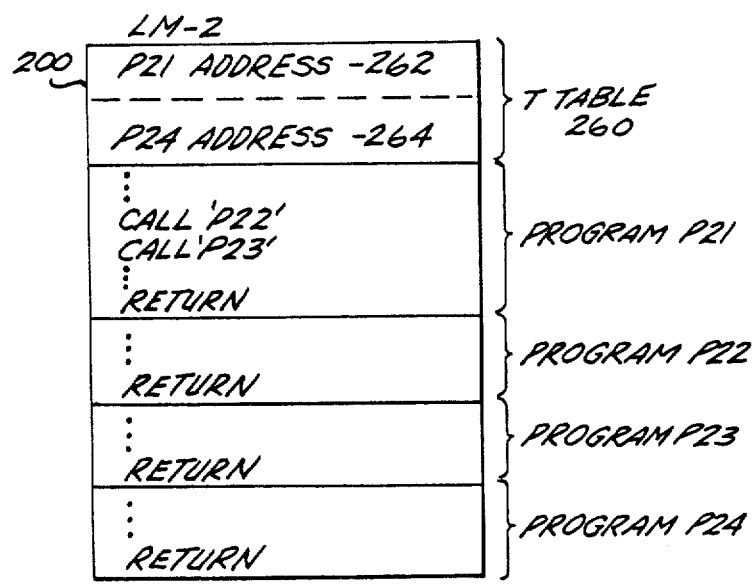

FIG. 1 schematically illustrates load modules 100 (LM-1) and 200 (LM-2) that incorporate a preferred embodiment of the program access system of the present invention. Load module 100 includes conventional programs P11 and P12 and program structure 110. Load module 200 includes T-table 260, and conventional programs P21, P22, P23 and P24. The symbols P21 and P24 positioned to the left of program structure 110 represent entry points and are discussed in greater detail below.

Program P11 includes statements that CALL programs P21 and P12. Program P12 includes a statement that CALLs program P24. Program P21 includes statements that CALL programs P22 and P23. Because programs P11 and P12 are included within the same load module, the statement CALL 'P12' in program P11 is resolved at the same time that load module 100 is created by the linkage editor. In a similar manner, the statements CALL 'P22' and CALL 'P23' in program P21 are resolved at the time that load module 200 is created by the linkage editor. However, when load module 100 is created, the statements CALL 'P21' in program P11 and CALL 'P24' in program P12 would not ordinarily be resolved, and would instead be listed as unresolved external references by the linkage editor. The program access system of the present invention, however, permits the CALLs to programs P21 and P24 to be resolved dynamically at the time that load module 100 is executed, despite the fact that no load modules exist under the names P21 or P24. It is to be understood that programs and program interrelationships shown in FIG. 1 are simply one arbitrary example of a software system selected to illustrate the present invention.

The program access system of the present invention is implemented, in the software system of FIG. 1, by means of program structure 110 within load module 100 and T-table 260 within load module 200. Program structure 110 includes E-table 120, linkage program 130, and S-table 140. E-table 120 includes an entry point and an associated table entry for each program called from load module 100 but no included within load module 100. Thus in the example of FIG. 1, E-table 120 includes entry points named P21 and P24 and corresponding table entries 121 and 125 respectively. Table entry 121 comprises branch statement 122, literal constant 123 and address constant 124. Table entry 125 comprises branch statement 126, literal constant 127 and address constant 128. Literal constants 123 and 127 consist of the names of the load modules in which programs P21 and p24 respectively are located. In the example of FIG. 1, both programs are located in load module 200 having the name LM-2. Address constants 124 and 128 are discussed below.

S-table 140 and T-table 260 both comprise table entries consisting of program names and associated addresses. S-table 140 and T-table 260 each include a table entry for each program called from either load module 100 or load module 200 but not included within the calling load module. Thus for example in FIG. 1, S-table 140 includes table entry 142 for program P21 and table entry 144 for program P24, and T-table 260 similarly includes table entry 262 for program P21 and table entry 264 for program P24. When load module 100 is created, the address fields of the S-table entries are initialized to the addresses of the corresponding E-table entry points for programs not contained within the same load module, or to relative addresses of those programs that are included within the same load module. The address fields for table entries 142 and 144 are therefore initialized to the addresses of E-table entry points P21 and P24 respectively. Similarly, when load module 200 is created, the address fields of the T-table entires are initialized to E-table address (if any) for programs not contained within the same load module, or to relative addresses of programs that are included within the same load module. The address fields of table entries 262 and 264 are therefore initialized to the relative addresses of programs P21 and P24 respectively within load module 200 when load module 200 is created.

Referring again to E-table 120 in load module 100, entry points P21 and P24 are "dummy" entry points and do not correspond to the actual programs P21 and P24. However, entry points P21 and P24 cause the linkage editor to "resolve" the statements CALL 'P21' and CALL 'P24' when load module 100 is created. Therefore, when the statement CALL 'P21' in program P11 is thereafter executed, control is passed to the statement at entry point P21 in E-table 120, i.e., to branch statement 122. Branch statement 122 causes a branch to linkage program 130. Linkage program 130, described in greater detail below, causes the operating system to load the load module identified by literal constant 123, i.e., load module 200. When load module 200 has been loaded, the operating system will return the load address of load module 200 to linkage program 130. Load module 200 includes T-table 260 located at a predetermined position within load module 200. In the embodiment illustrated in FIG. 1, the T-table is positioned at the beginning of load module 200. Linkage program 130 can therefore determine the address of T-table 260 from the load address of load module 200 supplied by the operating system.

After load module 200 is loaded, linkage program 130 proceeds to compare and update S-table 140 and T-table 260. As previously described, table entries 262 and 264 in the T-table are initialized to the relative addresses of programs P21 and P24 respectively when load module 200 is created. When load module 200 is loaded by linkage program 130 of load module 100, these relative addresses are converted to the actual loaded addresses of programs P21 and P24 respectively. As described above, S-table entries 142 and 144 contain the addresses of entry points P21 and P24 respectively in E-table 120. Linkage program 130 locates corresponding table entries 142 and 262, and copies the actual address in table entry 262 into the address constant of the E-table entry pointed to by table entry 142, i.e., into address constant 124 of E-table entry 121. Address constant 124 will then contain the actual address of program P21 in load module 200. At this time, the linkage program also modifies branch instruction 122, so that subsequent calls to program P21 from within load module 100 will result in an immediate transfer of control to the address specified by address constant 124, i.e., to program P21 in load module 200. An identical series of operations is carried out for table entries 144, 264 and 125. After the above matching and update functions have been completed, linkage program 130 transfers control to the actual address of program P21 in load module 200.

In the example of FIG. 1, program P21 CALLs programs P22 and P23, and then returns to program P11. The CALLs to P22 and P23 are conventional, and do not involve the program access system of the present invention. P11 later executes the statement CALL 'P12', resulting in the execution of the statement CALL 'P24' in program P12. The statement CALL 'P24' causes transfer of control to table entry 125 in E-table 120. At this time, table entry 125 has been modified as a result of the operations that occurred when load module 200 was initially loaded. As described above, such modifications to table entry 125 result in a direct transfer of control to program P24.

Figure 2:
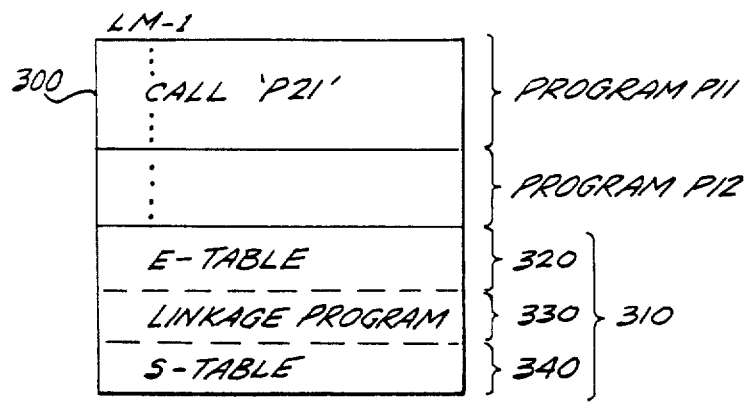
FIG. 2 is a schematic diagram of three load modules that include the program access system of the present invention.
Figure 2:
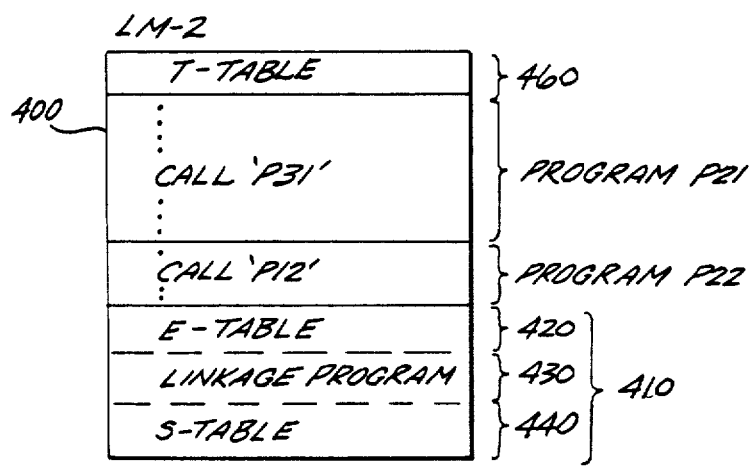
Figure 2:
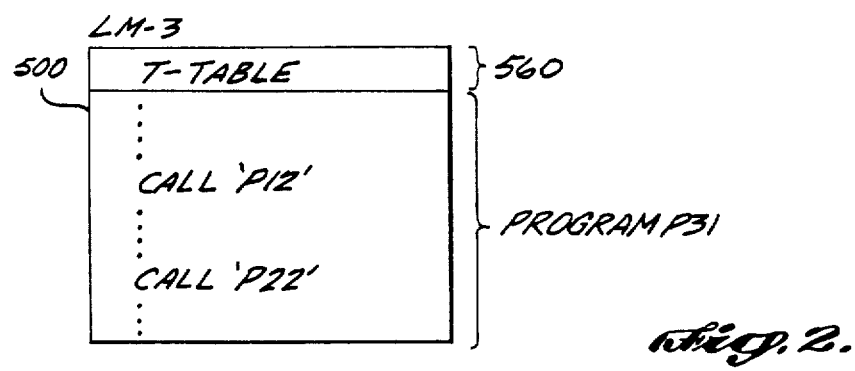

The program access system of the present invention may be employed in connection with any number of load modules. FIG. 2 illustrates a slightly more complex case involving load modules 300, 400 and 500. In order for a first load module to load a second load module according to the technique of the present invention, the first load module must include a program structure that preferably comprises an E-table, a linkage program and an S-table, and the second load module must include a program structure that preferably comprises a T-table. In the example of FIG. 2, load module 300 comprises programs P11 and P12, and program structure 310 that includes E-table 320, linkage program 330 and S-table 340. Program P11 includes a CALL to P21 in load module 400. It is assumed that load module 300 represents the starting point for program execution, and that load module 300 will therefore always be in memory. Since load module 300 therefore need never be loaded by another load module, load module 300 does not include a T-table.

Load module 400 comprises T-table 460, programs P21 and P22, and program structure 410. Program structure 410 includes E-table 420, linkage program 430, and S-table 440. Program P21 includes a statement that CALLs program P31 of load module 500, and program P22 includes a statement that CALLs program P12 of load module 300. T-table 460 enables load module 300 to load load module 400 and transfer control to program P21 when the statement CALL P21 is executed in program P11. Program structure 410 enables load module 400 to load load module 500 and transfer control to program P31 when the statement CALL P31 is executed. The statement CALL 'P21' in program P22 illustrates that once a linkage between two load modules (e.g., load modules 300 and 400) has been made, programs in the two load modules can freely CALL one another. One preferred mechanism of this "reverse" linkage is described below.

Load module 500 includes T-table 560 and program P31. T-table 560 enables load module 400 to load load module 500 and to transfer control to program P31 when program P31 is called from program P21. Program P31 includes statements that CALL programs P12 and P22. The CALL to program P12 illustrates that once a chain of load modules has been established by the techniques of the present invention, a CALL can proceed through any number of intermediate load modules in such a chain. One preferred mechanism of this "chaining" linkage is also described below.

Figure 6:
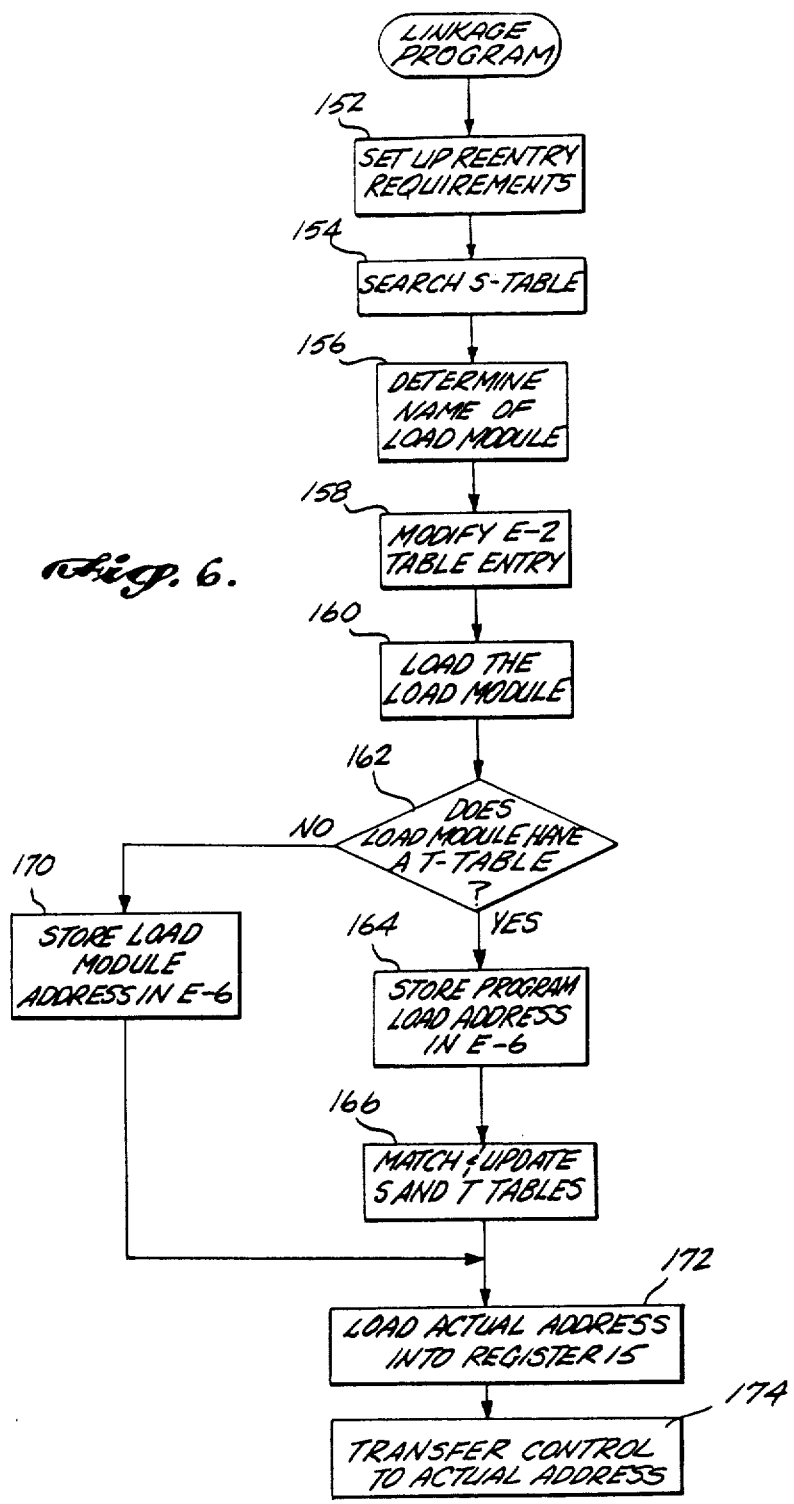
FIG. 6 is a source flowchart of a linkage program.

FIGS. 3–6 set forth the details of a preferred embodiment of the present invention, particularly adapted for operation under the IBM 370 OS/VSI and OS/MVS operating systems. FIGS. 3, 4 and 5 illustrate an E-table entry, an S-table entry and a T-table entry respectively, while FIG. 6 presents a flowchart of the linkage program suitable for use as linkage program 130 of FIG. 1 or linkage programs 330 or 430 of FIG. 2. Referring initially to FIG. 3, the left-hand column of FIG. 3 sets forth one preferred embodiment of the assembly language source code corresponding to table entry 121 of E-table 120 of FIG. 1. Similar source code would also be provided in the E-table for table entry 125. The right-hand column of the E-table of FIG. 3 contains reference designations for the table entry components.

Still referring to FIG. 3, statement E-1 is an assembler instruction which causes an entry point to be created at branch instruction E-2, such that a statement CALL 'P21' will cause transfer of control to branch instruction E-2. It will be assumed that the CALL statement corresponds to the normal Cobol CALL as it is defined in CODASYL documentation. In such a case, a CALL 'P21' statement will cause register 15 to be loaded with entry point address, i.e., with the address of E-2, and will then transfer control to such address. Therefore, a statement CALL 'P21' in load module 100 causes a transfer to E-2, which in turn causes a branch to an address 40 bytes beyond the address specified by register 15, i.e., 40 bytes beyond E-2. In the example shown in FIG. 3, each table entry in the E-table is assumed to require 20 bytes of storage, and it is further assumed that the E-table contains two table entries corresponding to the example of FIG. 1. The total length of the E-table will therefore be 40 bytes. Because linkage program 130 is located immediately after the E-table, branch instruction E-2 therefore causes a branch to the beginning of the linkage program. Similarly, branch information E-2 for table entry 125 will be coded B 20(R15).

Branch statement E-3 results in a branch to the address specified by register 15. The function of this statement is described below. Statement E4 is a null instruction, used to align the following table entry components on full-word boundaries. Literal constant E-5 is initialized to the name of the load module in which program P21 is located. Address constant E-6 is initialized to a null value. These constants correspond to literal constant 123 and address constant 124 respectively of FIG. 1. Statement E-7 is an assembler instruction which resets the origin and preparation for the succeeding E-table entry.

Referring now to FIG. 6, linkage program execution begins at block 152 by setting up reentry requirements for returning control to the calling program once the CALL sequence has been completed. Block 154 then searches the S-table of load module 100 for the entry corresponding to program P21. As indicated in FIG. 4, the S-table contains two constants for each table entry contained therein. The first constant (S-1) is the program name and the second constant (S-2) is initialized to the entry point address of the program. Since program P21 is not included within load module 100, address constant S-2 of S-table entry 142 is initialized to the address of branch instruction E-2 of E-table entry 121. If program P21 were located within load module 100, then address constant S-2 would be initialized to the relative address of program P21 within load module 100.

Referring again to FIG. 6, block 154 will locate the S-table entry corresponding to program P21 (i.e., table entry 142 of FIG. 1). As described, the address constants S-2 of the S-table entry 142 will contain the address of the corresponding E-table entry 121. Block 156 uses this S-2 address constant to access literal constant E-5 of E-table entry 121, E-5 containing the name of the load module in which program P21 is located. Block 158 then replaces branch statement E-2 of E-table entry 121 with the statement L R15, 16 (R15). As a result, the next time that a statement CALL 'P21' is executed in load module 100, control will be passed to the modified instruction E-2, which instruction will now load register 15 with the data contained in a location 16 bytes beyond the address specified by register 15, i.e., with address constant E-6. As described below, address constant E-6 will at that time contain the actual address of program P21 by reason of execution of block 164 or block 170 (FIG. 6) at the time that program P21 was first called from load module 100. After the load statement E-2 is executed, branch statement E-3 will then transfer control directly to such actual address, bypassing the entire linkage program for subsequent CALLs to program P21.

From block 158, control passes to block 160, which loads the load module specified by literal constant E-5, i.e., load module LM-2. Block 162 then locates the address in load module 200 at which the T-table should begin, and determines whether a T-table is present. If a T-table is not present, then block 170 copies the load module entry point provided by the linkage editor into address constant E-6 of the E-table entry corresponding to program P21, i.e., into address constant 124 of E-table entry 121. This procedure allows load modules without the program structures of the present invention to be intermixed with those which do have such program structures. Assuming the T-table is present, then control passes to block 164. Block 164 determines the actual load address of program P21 from information provided by the operating system, and stores such actual address in E-6 of E-table entry 121.

Once the actual load address of the called program (P21) has been determined and stored, block 166 performs a matching and update function between S-table 140 of load module 100 and T-table 260 of load module 200. The purpose of the match and update function is to create the required linkages between load modules 100 and 200 for programs other than the program (P21) whose CALL resulted in load module 200 being loaded. FIG. 5 sets forth the source code corresponding to table entry 262 of T-table 260 of FIG. 1, table entry 262 being the T-table entry corresponding to program P21. The table entry begins with comment statement T-1. For a T-table entry for a program not included within load module 200, statement T-1 would be coded ENTRY P21 for the reason explained below. Components T-2 and T-3 comprise the indicated load and branch instructions respectively, the purpose of these instructions also being explained below. T-4 is a null instruction, used to align succeeding components on full-word boundaries. Literal constant T-5 contains the name of the program (P21) to which the table entry corresponds. Address constant T-6 is initialized, by the statement DC V (P21), to the relative address of program P21 in loan module 200. Literal constant T-5 and address constant T-6 correspond to the program name (P21) and address fields of table entry 262 of FIG. 1. Assembler instruction T-7 resets the origin for the next T-table entry, it being assumed that each entry requires 20 bytes for storage.

Referring again to FIG. 6, assume for the sake of illustration that load module 200 was loaded as a result of a CALL to a program other than programs P21 and P24. Block 166 compares literal constants S-1 of table entries 142 and 144 with literal constants T-5 of table entries 262 and 264. For each match between S-1 and T-5, address constants S-2 and T-6 are checked. If T-6 has a non-null value, then its value is copied into E-6 (FIG. 3) whose address is determined from S-2. If T-6 contains a null value, then the value of S-2 is copied into T-6. Since program P21 is contained within load module 200, T-6 of table entry 262 will have a non-null value, i.e., the actual address of program P21, and such address will be copied into E-6 of E-table entry 121. In a similar manner, the actual address of program P24 will be copied into E-6 of table entry 125. The E-2 components are then replaced with load instructions, as described above. In the situation where T-6 contains a null value, then the address in S-2 is copied into T-6. This situation corresponds to a program located within the first load module that may be called from the second load module, e.g., program P12 of FIG. 2. As a result, all program links between load modules 100 and 200 are established when the load module is initially loaded, i.e., at the time that the first program in load module 200 is called from load module.

From either block 166 or block 170 of the linkage program of FIG. 6, control passes to block 172 which loads the actual address of the called program into register 15. Block 174 then transfers control to such actual address.

Referring to FIG. 2, the statement CALL 'P12' in program P31 of load module 500 requires that a link be created between T-table 460 and S-table 440 of load module 400. FIGS. 7 and 8 illustrate the S-table and T-table entries respectively in S-table 440 and T-table 460 that correspond to program P12. The required link between these entries is created by means of address constant S-2 and entry statement T-1. In particular, when load module 400 is created, the linkage editor will resolve address reference S-2, i.e., the statement DC V (P12) (FIG. 7), by inserting the address of entry point T-1 (FIG. 8) into address constant S-2. When load module 500 is loaded, the match and update function indicated at block 166 of FIG. 6 will copy the indirect address of program P12 from address constant S-2 of load module 400 into address constant T-6 of load module 500. When program P12 is later called from load module 500, control is passed to entry point P12 in T-table 560. The load and branch statements at T-2 and T-3 of this table entry then branch to the address specified in address constant T-6, i.e., to the address specified from address constant S-2 of the table entry for program P12 of load module 400. As indicated above, address constant S-2 of load module 400 contains the address of entry point T-1 in T-table 460 of load module 400. Thus, branch statement T-3 of load module 500 in fact causes a branch to entry point P12 in T-table 460.

While the preferred embodiment of the invention has been illustrated and described, it should be understood that variations will be apparent to those skilled in the art. For one example, the program access system of the present invention can be adapted for systems which permit CALLs to load modules in a program library (dynamic CALLs). To execute dynamic CALLs within the program access system of the present invention, the CALL statement would be replaced by a macro that moved the name of the load module to a save area, and then transferred control to the linkage program. In such a system, the linkage program (FIG. 6) would include a test after block 154 to determine whether the called program was in memory. If the program was in memory, then a direct branch to block 172 would be taken. By way of a second example, the different load modules that are linked together by the program access system of the present invention could be located in another partition of the same computer, or on another computer coupled to the first computer by local or remote communication lines. Accordingly, the invention is not to be limited to the specific embodiments illustrated and described, and the true scope and spirit of the invention are to be determined by reference to the appended claims.

I claim:

1. A method for operating a digital computer such that calling programs included in a first load module can CALL a callable program included in a second load module, the method comprising:
   (a) linking the first load module;
   (b) while linking the first load module, initializing a dummy entry point address for the callable program in the first load module;
   (c) commencing execution of the first load module;

(d) upon the occurrence of a CALL from a calling program to the callable program when the callable program has not yet been loaded,
 (i) determining the name of the second load module in which the callable program is included;
 (ii) loading the second load module;
 (iii) determining the actual address of the callable program;
 (iv) replacing said dummy entry point address with said actual address; and
 (v) transferring control to the callable program at said actual address; and
(e) upon the occurence of a CALL from a calling program to the callable program after the callable program has been loaded, transferring control to the callable program at said actual address.

2. The method of claim 1, wherein the method comprises, upon occurrence of a CALL from a calling program to the callable program in step (d) or (e);
 (1) branching to a program structure in the first load module associated with the callable program;
 (2) when the callable program has not yet been loaded, branching from the program structure to a linkage program that is operative to determine the name of the second load module; and
 (3) when a callable program has already been loaded, branching from the program structure to the callable program.

3. The method of claim 2, wherein the linkage program is operative to carry out the step of modifying the program structure such that subsequent CALLs from a calling program to the callable program branch directly to the callable program at said stored actual address.

4. The method of claim 2, wherein the first load module includes a first table that includes a first table entry comprising the name of the callable program and the address of the program structure associated with the callable program, wherein the program structure associated with the callable program includes the name of the second load module in which the callable program is located, and wherein the step of determining the name of the second load module comprises locating the first table entry that includes the name of the callable program, determining the address of the associated program structure, and accessing the name of the second load module from said associated program structure.

5. The method of claim 4, wherein the second load module includes a second table that includes one or more second table entries each comprising the name of a callable program and an address constant comprising the relative address of the callable program if the callable program is included in the second load module and otherwise a null address, and wherein the method comprises, after loading the second load module:
 replacing said relative address by said actual address;
 identifying corresponding first and second table entries that include the same callable program name;
 for those corresponding first and second table entries in which the second table entry includes a non null address constant, copying said non-null address constant into the program structure pointed to by the corresponding first table entry; and
 for those corresponding second table entries having a null address constant, copying the first table entry into the corresponding second table entry.

* * * * *